United States Patent
Foster et al.

(10) Patent No.: US 6,745,470 B2
(45) Date of Patent: Jun. 8, 2004

(54) VEHICLE WITH LARGE PLANAR COMPOSITE PANELS

(75) Inventors: Steven Foster, Rochester Hills, MI (US); Holly Giangrande, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/004,294

(22) Filed: Oct. 24, 2001

(65) Prior Publication Data

US 2002/0041112 A1 Apr. 11, 2002

Related U.S. Application Data

(62) Division of application No. 09/570,714, filed on May 15, 2000, now Pat. No. 6,349,988.

(51) Int. Cl.[7] ............................... B21D 53/88
(52) U.S. Cl. ..................... 29/897.2; 29/527.1; 264/46.4
(58) Field of Search ................ 29/897, 897.2, 29/897.3, 897.312, 897.32, 466, 527.1, 527.2; 52/270, 582.2, 464; 296/181, 183, 191, 901; 264/46.4, 46.6, 259, 45.3

(56) References Cited

U.S. PATENT DOCUMENTS

| | | | |
|---|---|---|---|
| 3,712,005 A | | 1/1973 | Eschbach et al. |
| 4,221,426 A | | 9/1980 | Wardill |
| 4,668,460 A | * | 5/1987 | Ongena |
| 5,037,591 A | * | 8/1991 | Rohrlach et al. |
| 5,042,395 A | | 8/1991 | Wackerle et al. |
| 5,140,913 A | | 8/1992 | Takeichi et al. |
| 5,397,409 A | * | 3/1995 | Kornylo |
| 5,403,062 A | | 4/1995 | Sjostedt et al. |
| 5,403,063 A | | 4/1995 | Sjostedt et al. |
| 5,526,622 A | | 6/1996 | Augustine |
| 5,582,789 A | * | 12/1996 | Stein et al. |
| 5,584,527 A | | 12/1996 | Sitter |
| 5,588,268 A | | 12/1996 | Sterflinger et al. |
| 5,635,306 A | | 1/1997 | Minamida et al. |
| 5,664,826 A | | 9/1997 | Wilkens |
| 5,681,095 A | | 10/1997 | Martin |
| 5,707,697 A | | 1/1998 | Spain |
| 5,725,712 A | | 3/1998 | Spain |
| 5,769,478 A | | 6/1998 | Vernese |
| 5,791,726 A | | 8/1998 | Kaufman |
| 5,824,251 A | * | 10/1998 | Morrison et al. |
| 5,916,643 A | | 6/1999 | Spain |

* cited by examiner

Primary Examiner—Charles T. Jordan
Assistant Examiner—T. Nguyen
(74) Attorney, Agent, or Firm—Carlson, Gaskey & Olds

(57) ABSTRACT

A vehicle trailer includes large side panels that are attached to a trailer superstructure. A method and apparatus for making the panels includes forming composite panels that are lightweight and economical to manufacture. In one embodiment, the superstructure has grooves for receiving the composite panels. The composite panels preferably fit together via a tongue and groove configuration. Alternatively, the superstructure has support beams that have threaded receiving holes. Each composite panel then includes threaded inserts aligned with the receiving holes and that attach to the receiving holes. In both embodiments, each composite panel preferably includes at least an outer colored layer, a sheet of polymeric material attached to the colored layer and an inner layer attached to the polymeric material. Other layers can be added depending upon the use of the vehicle. For instance, a layer of insulating foam can be added if the vehicle is to be refrigerated. Further, an additional structural support layer can be added to increase the strength of the walls.

20 Claims, 5 Drawing Sheets

VEHICLE WITH LARGE PLANAR COMPOSITE PANELS

This application is a divisional of Ser. No. 09/570,714 filed on May 15, 2000, now U.S. Pat. No. 6,349,988.

BACKGROUND OF THE INVENTION

This invention generally relates to lightweight body panels used in vehicles having large generally planar panels.

Many vehicles including large trucks, trailers, vans, etc. have large generally planar side panels. Currently, the panels are made of sheets of metal or perhaps plywood attached to a metal superstructure. The metal sheets are typically galvanized steel or stainless steel. Plastic sheet molding compound may be added to the exterior of the assembled superstructure. However, the plastic sheet molding compound needs to be painted. This added step increases the complexity of the assembly and the cost to manufacture the vehicle.

There are several disadvantages to this current manufacturing process. The process is very labor intensive. Further, the panels are very heavy. The heavier the vehicle, the less cargo that can be hauled since there are weight restrictions to preserve and protect the roads.

Therefore, there is a need for more lightweight panels for vehicles to maximize the quantity of goods that can be hauled. There is also a need to simplify the construction and minimize the cost of producing the vehicles.

SUMMARY OF THE INVENTION

A disclosed vehicle uses composite panels to overcome the above problems of standard vehicles made from sheet metal or plywood. In general terms, this invention discloses a lightweight vehicle panel for vehicles having large planar side panels, such as freight trailers, recreational vehicle trailers, step vans, etc. The vehicles preferably include a superstructure and a plurality of layered composite panels that attach to the superstructure.

Each composite panel preferably includes an outer colored layer, a polymeric material attached to the outer colored layer and an inner layer attached to the polymeric material. The panels can also contain more layers as needed for its end use. For instance, a layer of insulating foam can be added. Also, an added layer of structural support can be added anywhere between the outer colored layer and the inner layer. Further, multiple layers of any desired material can be included in each composite panel to meet any required specification.

Preferably, the superstructure includes grooves for receiving the composite panels and the composite panels fit together by a tongue and groove configuration. Alternatively, the superstructure includes support beams having receiving holes. Each composite panel may include threaded inserts aligned with the receiving holes for attachment to the receiving holes.

There are several advantages to using the composite panels of the present invention. Since the panels are made primarily from polymeric materials, they are much lighter than sheet metal. Further, the composite panels do not absorb water like plywood. The panels and superstructure of the present invention are easy to manufacture and assemble compared to the current method of forming the sheet metal and riveting all the pieces together. As a result, the composite panels are less expensive to manufacture. Also, it is less expensive to operate vehicles using the composite panels because the vehicle can haul a heavier load.

These and other features of the invention may be best understood from the following specification and drawings. The following is a brief description of the drawings.

DETAILED DESCRIPTION OF THE PREFERRED EMBODIMENT

Figure 1:
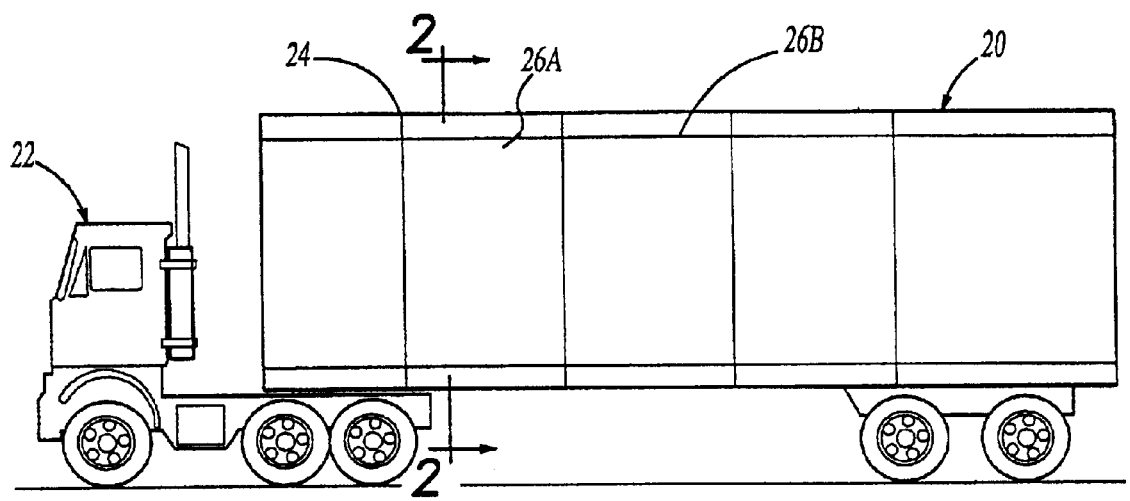
FIG. 1 is an elevational view of a trailer of the present invention attached to a tractor cab.

FIG. 1 illustrates a vehicle trailer, shown generally at 20, being hauled by a tractor cab 22. The trailer 20 includes a superstructure 24 and a plurality of layered composite panels 26 attached to the superstructure 24. The superstructure 24 is preferably made of metal but could alternatively be made from a polymer.

Figure 2:
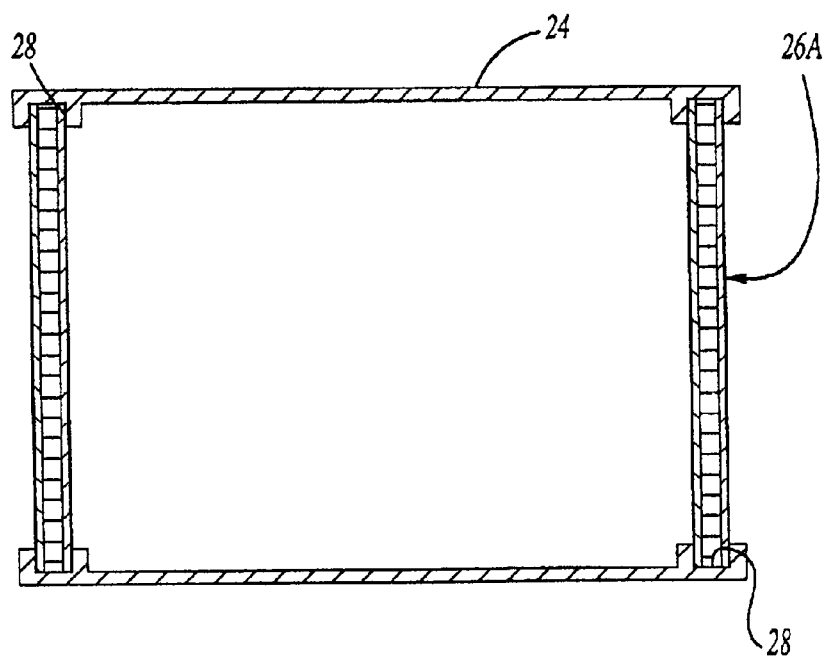
FIG. 2 is a cutaway view along line 2—2 of FIG. 1.
Figure 3:
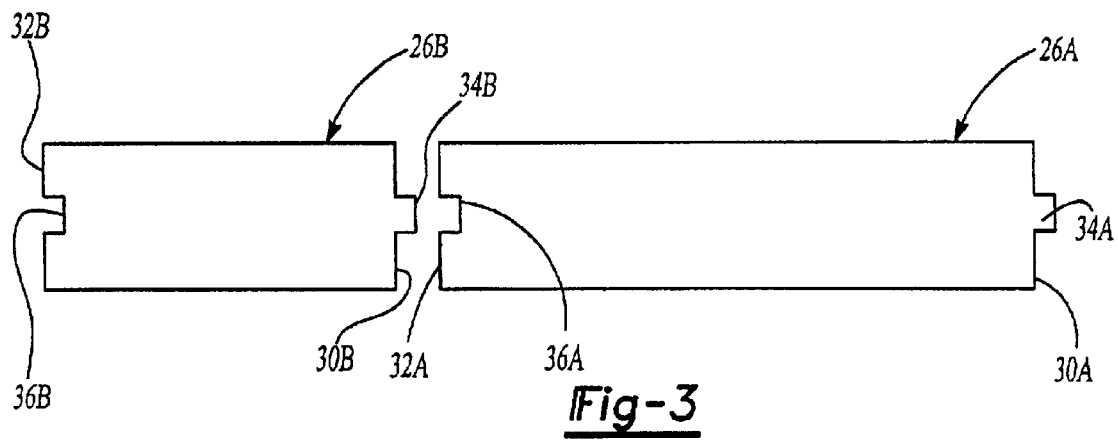
FIG. 3 is a top view of the preferred embodiment showing the composite panels fitting together.

Preferably, as shown in FIG. 2, the superstructure 24 has grooves 28 for receiving the composite panels 26. The composite panels 26 will form the walls of the trailer 20. Further, the composite panels 26 fit together by a tongue and groove arrangement. For example, as shown in FIG. 3, each composite panel 26 has a first edge 30 and a second edge 32. Each panel 26 has a tongue 34 positioned along its first edge 30 and a groove 36 positioned along its second edge 32.

Specifically, a first panel 26A is positioned in the grooves 28 of the superstructure 24 to begin forming the walls of the trailer 20. Next, a second panel 26B is positioned in the grooves 28 of the superstructure 24. The second edge 32A of the first panel 26A abuts a first edge 30B of a second panel 26B. Specifically, the groove 36A of the first panel 26A receives the tongue 34B of the second panel 26B. This continues with other panels 26 until the walls of the trailer 20 are complete.

Figure 4:
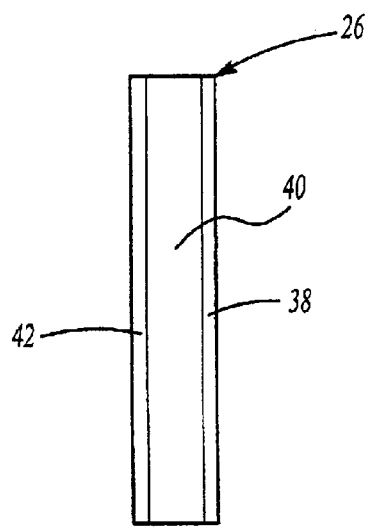
FIG. 4 is a cutaway view of a composite panel.

As shown in FIG. 4, preferably, each composite panel 26 includes an outer colored layer 38, a sheet of polymeric material 40 attached to the colored layer 38, and an inner layer 42 attached to the polymeric material 40. Different types of materials can be used for each of the layers.

The outer colored layer 38 is preferably made from a paintless polymer film. Alternatively, a prepainted metal, like aluminum could be used. No painting is required if either of these materials is used as the outer layer 38. Alternatively, an unpainted metal could be used as the outer layer 38. Preferably, the outer layer 38 is positioned in the trailer 20 facing outward.

There are also many options for the polymeric material 40. For instance, the polymeric material can be reinforced. The reinforcements can include reinforcing fibers, integrated support ribs that are molded into the component, or an external framework molded into the material. Further, there is great flexibility with the polymeric material in terms of its thickness.

There are also many options for the inner layer 42. However, the selected material depends on the function of the trailer. For example, metal could be used for the inner layer 42. The metal could be stainless steel, an unpainted metal, or a prepainted metal. A stronger material, like metal, would be used to contain the contents of the trailer and prevent them from breaking through the wall. Another layer of a polymeric material could be used as the inner layer 42 including a paintless film or a textured film. Finally, any type of interior decor could be used including, but not limited to, cloth or wallpaper.

Figure 5:
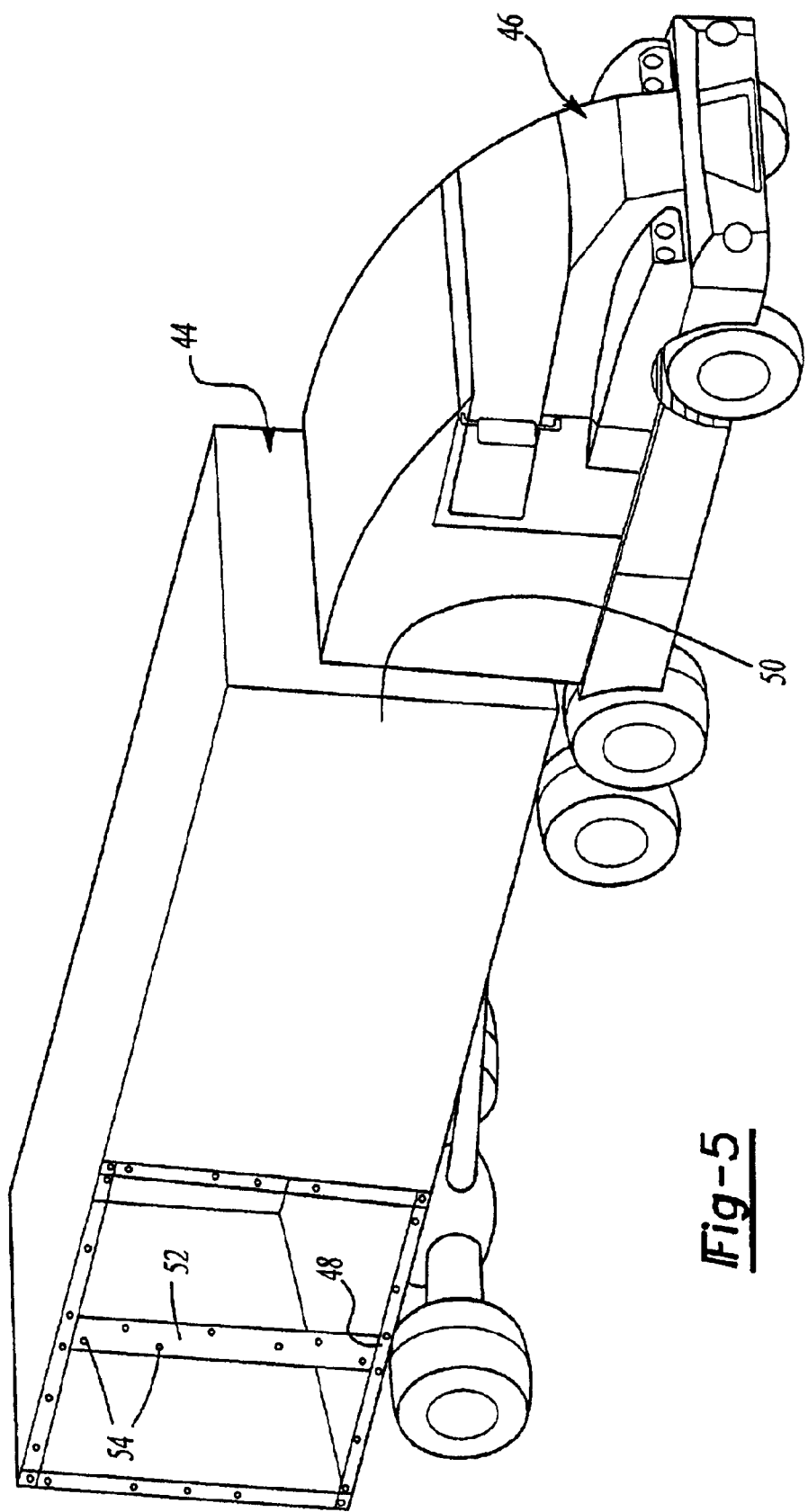
FIG. 5 is a perspective view of an alternative embodiment shown on a trailer that is attached to a tractor cab.

An alternative embodiment trailer 44 is shown in FIG. 5 being hauled by a tractor cab 46. Similar to the preferred embodiment, the freight trailer 44 includes a superstructure 48 and a plurality of layered composite panels 50 attached to the superstructure 48.

Figure 6:
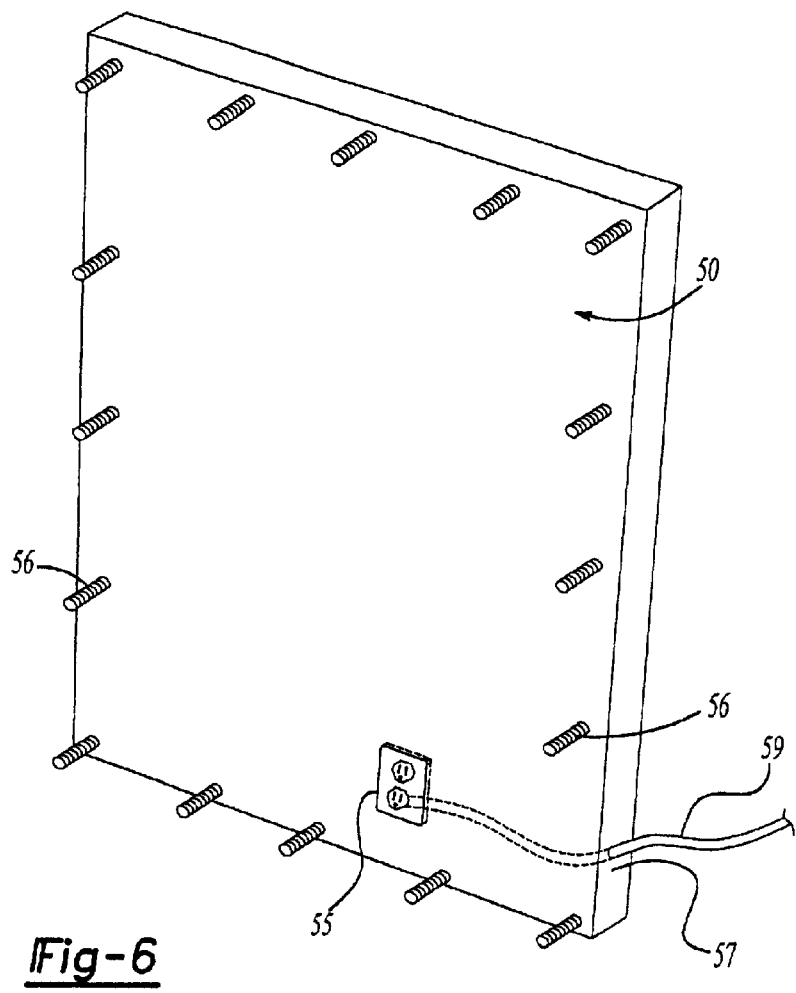
FIG. 6 is a perspective view of an alternative embodiment of a composite panel.

Preferably, the superstructure 48 has support beams 52. Each support beam 52 preferably has at least one threaded receiving hole 54. As shown in FIG. 6, each composite panel 50 includes threaded inserts 56 that are aligned with the receiving holes 54. The threaded inserts 56 engage with the threaded receiving holes 54 to connect the panels 50 to the superstructure 48.

The inserts 56 can be made from either metal or plastic. Further, the inserts 56 are preferably molded into the composite panels 50.

Also shown in FIG. 6 is an electrical outlet 55 and a layer of wiring conduit 57 for holding wires 59, shown partially in phantom, that run throughout the trailer 20, 44.

Figure 7:
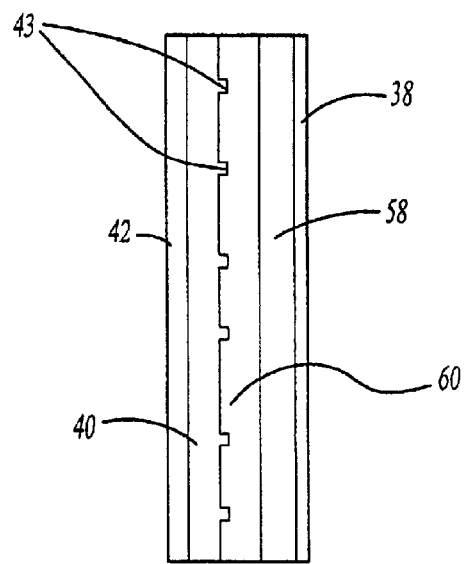
FIG. 7 is a cutaway view of an alternative embodiment of a composite panel.

As shown in FIG. 7, preferably, each composite panel includes the same layers that were disclosed in the FIG. 4 embodiment, including an outer colored layer 38, a sheet of polymeric material 40 and an inner layer 42. However, other layers can be added to the composite panels. Some or all of the following options can be used. For instance, a layer of insulating foam 58 can be added and/or an additional structural support layer 60 can also be included in the composite panel. A layer can also be added to act as a vapor barrier.

A thermal insulating foam can be used if the trailer will be refrigerated. The insulating foam can be fiberglass insulation. Alternatively or additionally, depending upon the end user's requirements, an acoustical foam can be used. Also, the thickness of the insulating foam can be adjusted according to the end user's requirements.

A separate structural support layer 60 can be added to the panel. Alternatively, support ribs 43 can be molded directly into the panel. Additional structural support may be necessary to prevent the contents in the trailer from breaking through the panels when the vehicle turns.

A wire conduit layer can be included in the composite panel. Electrical outlets can also be molded into the composite panels. Preferably, the electrical outlets face the interior of the trailer. All of these layers can be used with either the FIG. 4 panels or the FIG. 6 panels.

It is important to note that any of the panels can be used with freight trailers, recreational trailers, step vans, or any other vehicles having large planar side panels.

Figure 8:
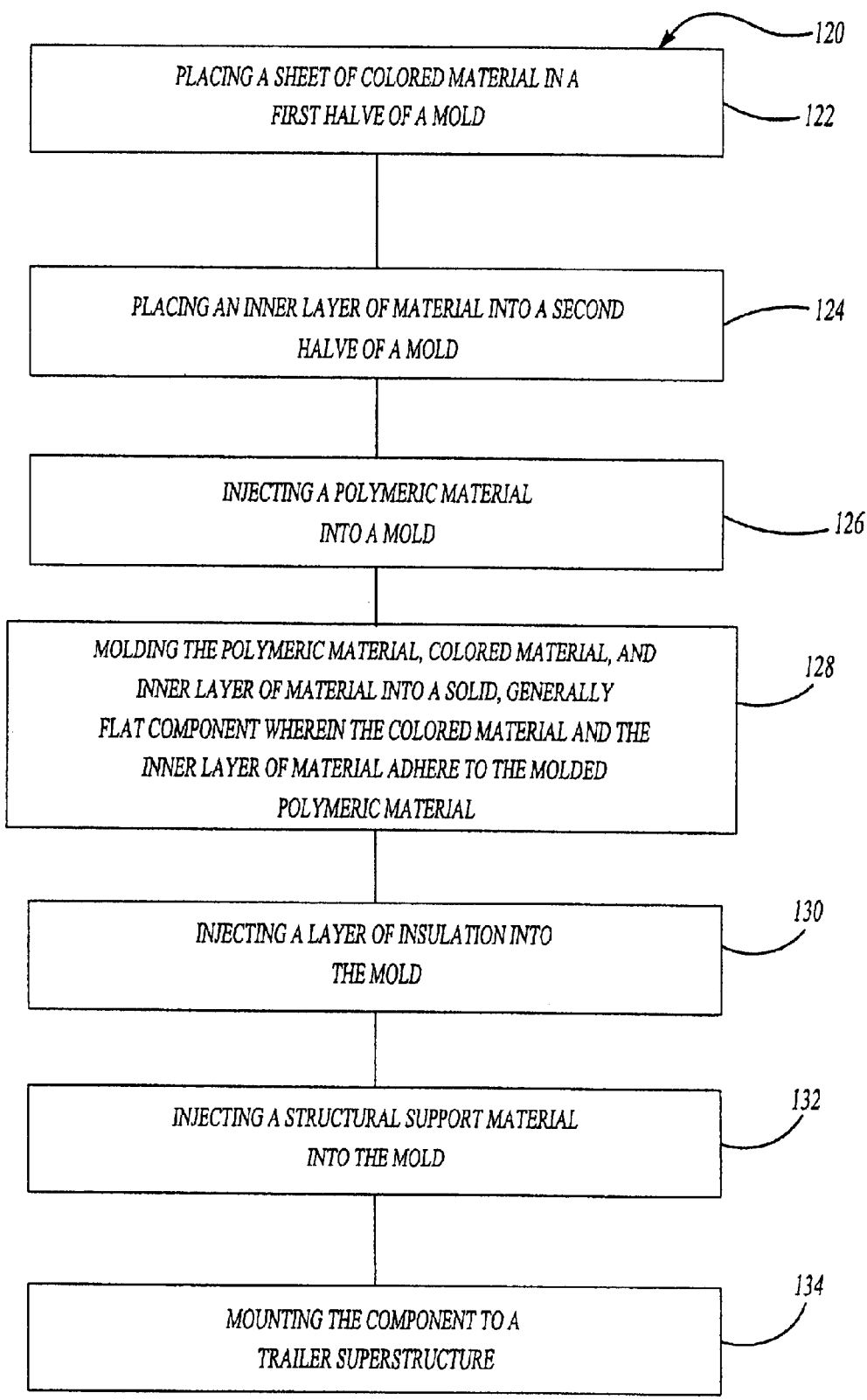
FIG. 8 is a flowchart diagram illustrating the method of making the composite panels and trailer.

FIG. 8 schematically illustrates the method of forming a composite panel for a vehicle. The flow chart 120 includes a first step at 122 where a sheet of colored material is placed in a first halve of a mold. At 124, an inner layer of material is placed into a second halve of a mold. At 126, a polymeric material is injected into the mold. The polymeric material, colored material and inner layer of material are molded into a solid, generally flat component wherein the colored material and the inner layer of material adhere to the molded polymeric material at 128. At 130, a layer of insulation is injected into the mold. The component could be cured at this point. At 132, a structural support material is injected into the mold. The component could be cured again at this point. At 134, the component is mounted to a vehicle superstructure. Other molding techniques can be used. As an example, rather than plug panels in the mold, a multi-shot molding process can be used. Further, wiring conduit and electrical outlets can be added during the molding process.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A method of forming a trailer panel for attachment to a vehicle trailer comprising the steps of:
    (a) placing a layer of colored material in a mold by placing a sheet of colored material into the mold to form an outer layer presenting an outer surface of the trailer panel;
    (b) placing an inner layer into the mold to form an inner surface of the trailer panel;
    (c) injecting a layer of polymeric material in the mold to form a central layer;
    (d) integrally molding the layer of colored material, the inner layer, and the layer of polymeric material as one piece to form a generally flat trailer panel; and
    (e) mounting the trailer panel to a trailer superstructure frame.

2. The method according to claim 1 wherein the outer layer comprises a paintless polymer film.

3. The method according to claim 1 wherein the outer layer comprises a prepainted aluminum.

4. The method according to claim 1 wherein the polymeric material includes reinforcing fibers.

5. The method according to claim 1 wherein the inner layer comprises a metallic material.

6. The method according to claim 1 wherein the inner layer comprises a polymeric material.

7. The method according to claim 1 including the step of injecting a layer of insulation into the mold.

8. The method according to claim 1 including the step of injecting a structural support layer into the mold for forming at least one rib.

9. The method according to claim 1 wherein step (e) includes forming a male member in one of the trailer superstructure frame or the trailer panel, forming a female member in the other of the trailer superstructure frame or the trailer panel, and inserting the female member into the male member.

10. The method according to claim 9 including the steps of forming the female member as a tongue along at least one edge of the panel and forming the male member as a groove on the trailer superstructure frame.

11. The method according to claim 1 wherein step (e) includes forming receiving holes in support beams of the trailer superstructure frame, mounting threaded fasteners to the trailer panel, and threading the fasteners into the receiving holes.

12. The method according to claim 1 including the step of forming at least one wiring conduit in the trailer panel during step (d).

13. The method according to claim 1 including the step of forming at least one electrical outlet in the trailer panel during step (d).

14. The method according to claim 1 wherein step (d) further includes the step of integrally forming an attachment structure in the trailer panel and wherein step (e) further includes the step of mounting the attachment structure to the trailer superstructure frame.

15. The method according to claim 14 including the step of forming the attachment structure to include a first attachment member formed on one edge of the trailer panel and a second attachment member formed on an opposite edge of the trailer panel.

16. A method of making panels to form a vehicle trailer comprising the steps of:
   (a) placing a layer of colored material in a mold by placing a sheet of colored material into the mold to form an outer layer presenting an outer surface of the trailer panel;
   (b) placing an inner layer into the mold to form an inner surface of the trailer panel;
   (c) injecting a layer of polymeric material in the mold to form a central layer;
   (d) integrally molding the layer of colored material, the inner layer, and the layer of polymeric material as one piece to form a generally flat trailer panel;
   (e) repeating steps (a)–(d) to form multiple trailer panels; and
   (f) mounting a plurality of trailer panels to a trailer superstructure frame to form a vehicle trailer.

17. The method according to claim 16 wherein step (f) includes providing the superstructure frame with multiple support beams spaced apart from one another to form a plurality of trailer panel installation positions and further includes the step of installing one trailer panel in each installation position.

18. The method according to claim 17 including forming a first mount at on the support beams at each installation position, forming a second mount on each trailer panel, and engaging the first and second mounts to secure each trailer panel to the superstructure frame.

19. The method according to claim 16 wherein step (d) further includes the step of integrally forming an attachment structure in the trailer panel and wherein step (e) further includes the step of mounting the attachment structure to the trailer superstructure frame.

20. The method according to claim 19 including the step of forming the attachment structure to include a first attachment member formed on one edge of the trailer panel and a second attachment member formed on an opposite edge of the trailer panel.

* * * * *